(12) United States Patent
Huang et al.

(10) Patent No.: US 9,232,009 B2
(45) Date of Patent: Jan. 5, 2016

(54) DATA INTEGRATION APPARATUS FOR USE IN SENSOR NETWORK

(71) Applicant: Institute For Information Industry, Taipei (TW)

(72) Inventors: Tzu-Che Huang, Taipei (TW); Pei-Lin Hou, New Taipei (TW); Chi-Wen Teng, New Taipei (TW)

(73) Assignee: Institute For Information Industry, Taipei (TW)

( * ) Notice: Subject to any disclaimer, the term of this patent is extended or adjusted under 35 U.S.C. 154(b) by 102 days.

(21) Appl. No.: 14/105,116

(22) Filed: Dec. 12, 2013

(65) Prior Publication Data

US 2015/0163099 A1    Jun. 11, 2015

(30) Foreign Application Priority Data

Dec. 9, 2013    (TW) .............................. 102145104 A

(51) Int. Cl.
| | | |
|---|---|---|
| *G01R 31/08* | (2006.01) | |
| *H04L 29/08* | (2006.01) | |
| *H04W 28/02* | (2009.01) | |
| *H04L 12/24* | (2006.01) | |
| *H04L 12/911* | (2013.01) | |
| *H04L 12/40* | (2006.01) | |

(52) U.S. Cl.
CPC ................. *H04L 67/12* (2013.01); *H04L 12/40* (2013.01); *H04L 29/08558* (2013.01); *H04L 41/0816* (2013.01); *H04L 47/70* (2013.01); *H04W 28/0252* (2013.01)

(58) Field of Classification Search
USPC ................. 370/252, 241, 256, 329, 338, 431; 455/11.1, 452.1, 509
See application file for complete search history.

(56) References Cited

U.S. PATENT DOCUMENTS

| | | | | |
|---|---|---|---|---|
| 7,688,778 | B2 * | 3/2010 | Ogushi ......................... | 370/328 |
| 8,300,615 | B2 * | 10/2012 | Copeland et al. ............. | 370/338 |
| 8,325,637 | B2 * | 12/2012 | Salsbury et al. .............. | 370/310 |
| 8,892,135 | B2 * | 11/2014 | Werb et al. .................... | 455/462 |
| 2003/0153338 | A1 * | 8/2003 | Herz et al. .................... | 455/517 |
| 2009/0161642 | A1 * | 6/2009 | Twitchell, Jr. ................ | 370/338 |
| 2010/0074133 | A1 * | 3/2010 | Kim et al. ..................... | 370/252 |
| 2010/0177750 | A1 * | 7/2010 | Essinger et al. .............. | 370/338 |
| 2013/0003591 | A1 * | 1/2013 | Novak et al. .................. | 370/252 |
| 2013/0148526 | A1 * | 6/2013 | Hwang et al. ................. | 370/252 |

FOREIGN PATENT DOCUMENTS

JP    2007243478 A    9/2007

OTHER PUBLICATIONS

Office Action to the corresponding Japanese Patent Application No. 2014-234460 rendered by Japan Patent Office (JPO) on Oct. 27, 2015, 8 pages (including English translation).

* cited by examiner

*Primary Examiner* — Phuongchau Ba Nguyen
(74) *Attorney, Agent, or Firm* — Skaar Ulbrich Macari, P.A.

(57) ABSTRACT

A data integration apparatus for use in a sensor network system is provided. The sensor network system includes a sensor network and an application server. The data integration apparatus receives text commands associated with access of the sensor network from the application server, and accomplishes the operations of the tabled data provided by the network node of the sensor network by using the text commands and the hardware configurations of the sensor network cooperatively.

8 Claims, 8 Drawing Sheets

DATA INTEGRATION APPARATUS FOR USE IN SENSOR NETWORK

PRIORITY

This application claims priority to Taiwan Patent Application No. 102145104 filed on Dec. 9, 2013, which is hereby incorporated by reference herein in its entirety.

FIELD

The present invention relates to a data integration apparatus for use in a sensor network. More particularly, the data integration apparatus for use in a sensor network provided by the present invention accesses tabled data of the sensor network by using text commands and hardware configuration settings to accomplish the communication between an application and the sensor network.

BACKGROUND

In conventional sensing applications, a sensor or a controller is adapted to a host board where a sensing application is loaded via mainly a sensor adapter board of a particular specification and through a bus. When an application is developed, the sensor provider must provide the associated application developer with an application programming interface for communicating with the host board driving program so as to perform the sensing. For different sensing development environments and program development languages, various different sets of application interfaces are needed to develop a plurality of sensing applications.

If the aforesaid host board is placed into a sensor network architecture, then it becomes a network node. Each network node connects to a primary node via mainly a wireless or wired communication protocol. The primary node is connected to the host board where the sensing application is loaded via an adapter board of a particular specification (e.g., a universal asynchronous receiver transmitter (UART)).

A user can execute an application associated with a single sensor on one node to communicate with the host board driving program, and perform operations associated with the sensor via the sensor adapter board and the network node. However, in cases where the sensor network architecture is not supported by the application interface, the support of the host board and the primary node and the communication between the host board and the sensing network need to be taken into consideration when the application is developed in order to communicate with the sensor successfully when the application is executed.

Further, sensors, network nodes and sensor adapter boards produced by different sensor manufactures usually have different specifications. Therefore, how to make further interpretations for different data contents generated by the sensor adapter boards, the network nodes of different specifications and the buses therebetween also needs to be taken in to consideration during development of the application.

Accordingly, not only each sensor provider must expand their application interfaces additionally to the network level, but also multiple sets of application interfaces need to be prepared according to various different networks, different development environments and different development languages. Therefore, the conventional application interfaces represent a great burden to the sensor providers. Moreover, the need of developing the sensing network applications via different application interfaces makes the development of the sensing network applications quite inconvenient and inflexible.

Accordingly, an urgent need exists in the art to provide a solution capable of improving the sensing data processing manner based on the existing sensor network hardware architecture so as to accelerate the development of the application and improve the flexibility in use of the application.

SUMMARY

A primary objective of certain embodiments of the present invention is to provide a data integration apparatus for use in a sensor network system. The sensor network system comprises a sensor network and an application server. The data integration apparatus comprises a resource allocation module, a data interface processing unit, a resource attribute processing unit, a logic bus processing unit and a network interface processing unit. The resource allocation module is stored with a sensor resource profile, a bus profile, a resource-bus mapping profile and a network node profile.

The data interface processing unit connected with the application server is configured to: receive a sensor query command from the application server; query the sensor resource profile according to the sensor query command and retrieve a sensor type configuration from the sensor resource profile; and transmit a sensor bus query command according to the sensor type configuration. The resource attribute processing unit is configured to: query the resource-bus mapping profile according to the sensor bus query command and retrieve a bus mapping configuration from the resource-bus mapping profile; query the bus profile according to the bus mapping configuration and retrieve a bus type configuration from the bus profile; and transmit a network node query command according to the bus type configuration.

The logic bus processing unit is configured to: query the network node profile according to the network node query command and retrieve a network node mapping configuration from the network node profile. The network interface processing unit connected with the sensor network is configured to: access the sensor network according to the network node mapping configuration and transmit a query response back to the application serve. The query response comprises a network node identification code and a piece of network node sensor information.

The detailed technology and preferred embodiments implemented for the subject invention are described in the following paragraphs accompanying the appended drawings for people skilled in this field to well appreciate the features of the claimed invention.

DETAILED DESCRIPTION

In the following description, certain embodiments of the present invention will be explained with reference to example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention. In the following embodiments and attached drawings, elements unrelated to the present invention are omitted from depiction; and dimensional relationships among the individual elements in the attached drawings are illustrated only for the ease of understanding, but not to limit the actual scale.

Figure 1:
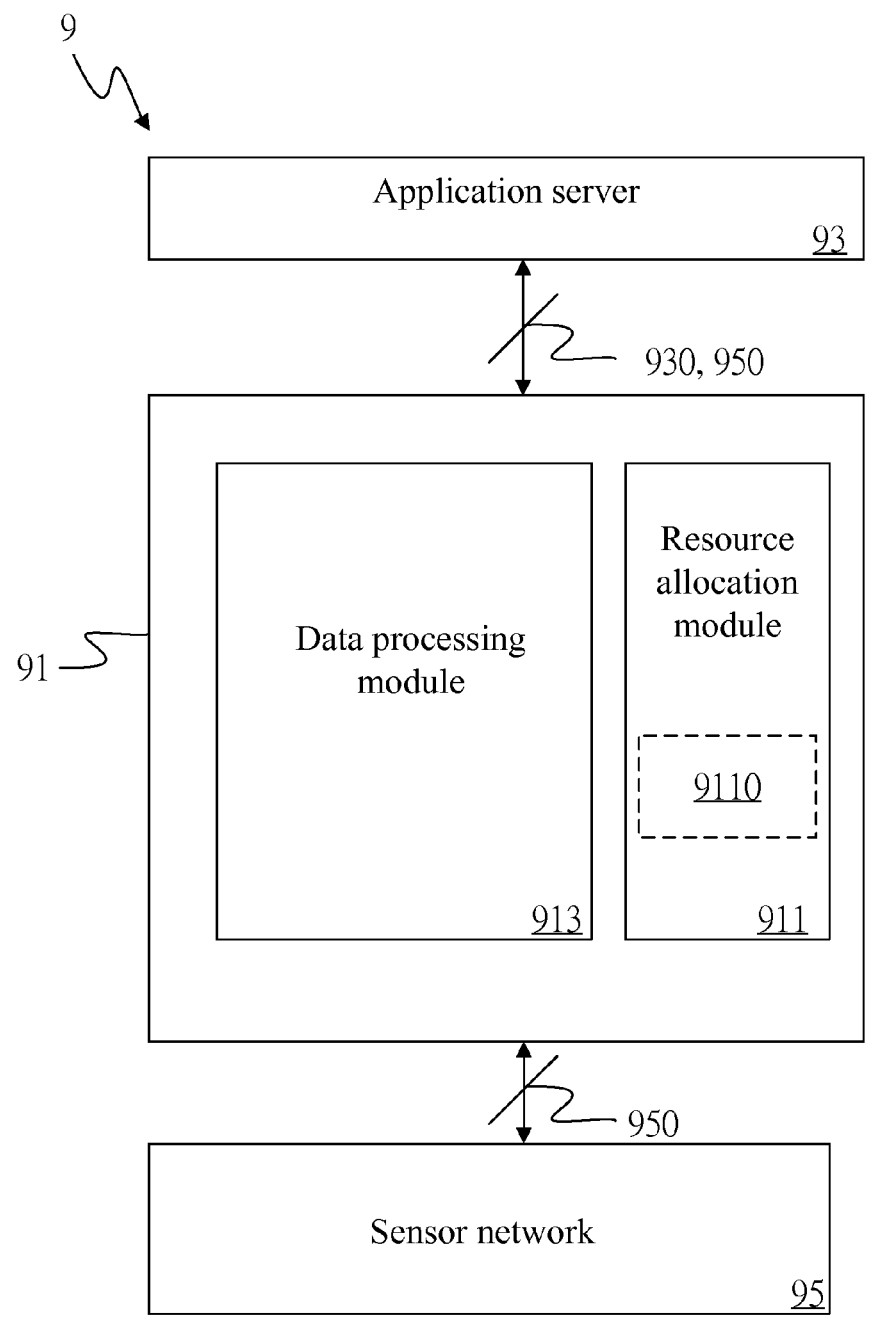
FIG. 1 is a schematic view of a sensor network system according to a first embodiment of the present invention.

Referring to FIG. 1, it is a schematic view of a sensor network system 9 according to a first embodiment of the present invention. The sensor network system 9 comprises a data integration apparatus 91, an application server 93 and a sensor network 95. The data integration apparatus 91 comprises a resource allocation module 911 and a data processing module 913. The data processing module 913 is connected with the application server 93 and the sensor network 95. The resource allocation module 911 is stored with a sensor configuration 9110. Interactions between individual network elements will be further described hereinafter.

Firstly, when a user wants to perform operations of the sensor network 95 via a sensor application of the application server 93, the user needs to query about available sensors of the sensor network 95 firstly. Therefore, the user may transmit a sensor query command 930 via the application server 93. Subsequently, the data processing module 913 accesses the sensor configuration 9110 according to the sensor query command 930 after receiving the sensor query command 930 from the application server 93.

It should be appreciated that, the resource allocation module 911 may be selected from data storage elements of various forms (e.g., a memory, a hard disc and the like). The sensor configuration 9110 mainly records the configuration data associated with the sensors of the sensor network 95. The configuration data associated with the sensors are updated each time it is accessed. In this way, the data processing module 913 can know a state of the sensor network 95 by accessing the sensor configuration 9110 and further query the sensor network 95. Then, the data processing module 913 can obtain a query response 950 and transmit the query response 950 back to the application server 93 to accomplish the communication between the application server 93 and the sensor network 95.

Figure 2:
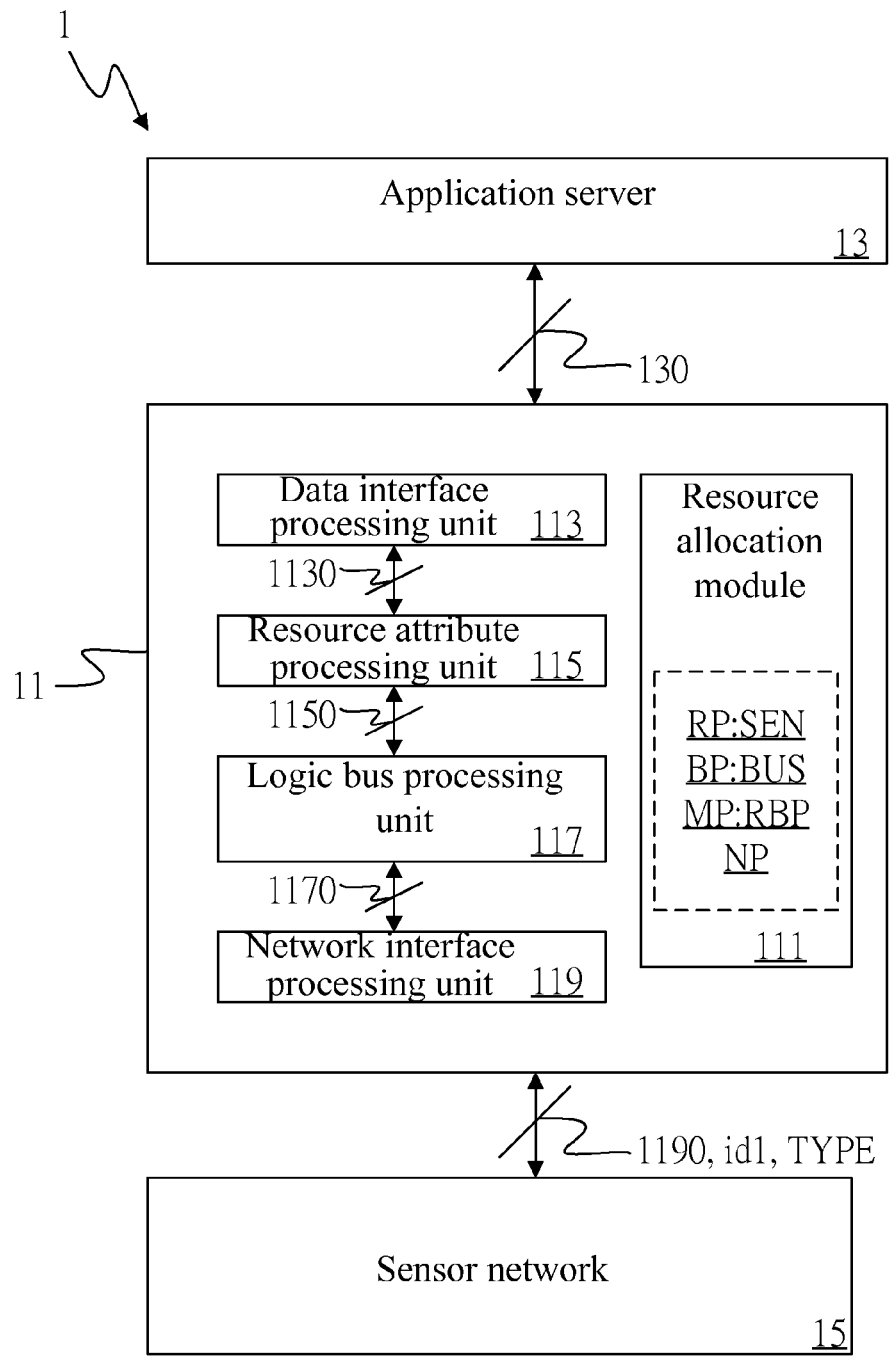
FIG. 2 is a schematic view of a sensor network system according to a second embodiment of the present invention.

Referring to FIG. 2, it is a schematic view of a sensor network system 1 according to a second embodiment of the present invention. The sensor network system 1 comprises a data integration apparatus 11, an application server 13 and a sensor network 15. The data integration apparatus 11 comprises a resource allocation module 111, a data interface processing unit 113, a resource attribute processing unit 115, a logic bus processing unit 117 and a network interface processing unit 119. The data interface processing unit 113 is connected with the application server 13, and the network interface 119 is connected with the sensor network 15. It should be appreciated that, the aforesaid processing units may be implemented by the same processing unit hardware or by different processing unit hardware.

The resource allocation module 111 is stored with a sensor resource profile RP, a bus profile BP, a resource-bus mapping profile MP and a network node profile NP. The sensor resource profile RP records information related to the sensors, the bus profile BP records information related to the bus, the resource-bus mapping profile MP records information related to the resource-bus mapping, the network node profile NP records information related to the network node and the output/input, and the contents of the network node profile NP are updated after each query. Interactions between individual elements will be further described hereafter.

Firstly, when a user wants to perform operations of the sensor network 15 via the sensor application of the application server 13, the user needs to query about available sensors of the sensor network 15. Therefore, the user may transmit a sensor query command 130 via the application server 13. Subsequently, the data interface processing unit 113 receives the sensor query command 130, queries the sensor resource profile RP according to the sensor query command 130, and retrieves a sensor type configuration SEN from the sensor resource profile RP.

It should be appreciated that, the sensor resource profile RP records the sensor type configuration SEN, which indicates that a network node in the senor network 15 is provided with a sensor associated with the sensor type configuration SEN. Then, the data interface processing unit 113 can transmit a sensor bus query command 1130 according to the sensor type configuration SEN to confirm what kind of bus is used by the sensor associated with the sensor type configuration SEN.

Specifically, the resource attribute processing unit 115 then queries the resource-bus mapping profile MP according to the sensor bus query command 1130 and retrieves a bus mapping configuration RBP from the resource-bus mapping profile. The bus mapping configuration RBP records the bus used by the sensor type configuration SEN.

Accordingly, the resource attribute processing unit 115 can further query the bus profile BP according to the bus mapping configuration RBP to retrieve a bus type configuration BUS associated with the sensor type configuration SEN from the bus profile BP. Subsequently, the resource attribute processing unit 115 transmits a network node query command 1150 according to the bus type configuration BUS.

Then, the logic bus processing unit 117 transmits a node support query command 1170 according to the network node query command 1150. Finally, the network interface processing unit 119 queries the sensor network 15 according to the node support query command 1170 and transmits a query response 1190 to the application server 13. The query response 1190 comprises a network node identification code id1 and a piece of network node sensor information TYPE. In this way, the communication between the application server 13 and the sensor network 15 is accomplished by the data integration apparatus 11.

For ease of understanding, the aforesaid operation process will be illustrated by an example. Likewise, when the user wants to perform the operations of the sensor network via the sensor application of the application server, the user needs to query about the available sensors of the sensor network. Therefore, the user can transmit a sensor query command "SELECT FROM ida-info" via the application server to query what kind of sensor is supported by the sensor network.

Subsequently, the data interface processing unit receives the sensor query command "SELECT FROM ida-info" and queries the sensor resource profile RAA according to the sensor query command "SELECT FROM ida-info". The sensor resource profile RAA is an embodiment of the RP in FIG. 2 as follows:

```
<RAA>
   <Resource>
      <Name>CO2S</Name>
   </Resource>
</RAA>
```

Since the sensor resource profile RAA has a configuration setting associated with a carbon dioxide sensor recorded therein, it indicates that there is a node provided with a carbon dioxide sensor in the sensor network. Therefore, the data interface unit retrieves a sensor type configuration CO2S from the sensor resource profile RAA.

Then, the data interface processing unit issues a sensor bus query command "RAA.CO2S -L" to the resource attribute processing unit according to the sensor type configuration CO2S retrieved so as to confirm what kind of bus is used by the sensor associated with the sensor CO2S. The resource attribute processing unit then queries the resource-bus mapping profile Mapping according to the sensor bus query command "RAA. CO2S -L". The resource-bus mapping profile Mapping is an embodiment of the MP in FIG. 2 as follows:

```
<Mapping>
    <ResourceOnBus>
        <Resource>CO2S</Resource>
        <Bus>GPIO</Bus>
        ..
    </ResourceOnBus>
</Mapping>
```

Accordingly, the resource attribute processing unit retrieves the bus mapping configuration CO2S.GPIO from the resource-bus mapping profile Mapping, and the bus mapping configuration CO2S.GPIO records that a universal output/input bus is used corresponding to the sensor type configuration CO2S.

Accordingly, the resource attribute processing unit can further query the bus profile LBA according to the bus mapping configuration GPIO. The bus profile LBA is an embodiment of the BP in FIG. 2 as follows:

```
<LBA>
    <Bus>
        <Name>GPIO</Name>
    </Bus>
    <BusProfile>
        <Name>GPIO</Name>
        <Port>...</Port>
    </BusProfile>
</LBA>
```

Thus, a bus type configuration GPIO associated with the sensor type configuration CO2S is retrieved from the bus profile LBA. Subsequently, the resource attribute processing unit transmits a network node query command "LBA.GPIO -L" according to the bus type configuration GPIO.

Then, the logic bus processing unit transmits a node support query command "list" to the network interface processing unit according to the network node query command "LBA.GPIO -L". The network interface processing unit transmits a query response "NodeID:CO2S" back to the application server via the aforesaid query processing path according to the node support query command "list". The "NodeID:CO2S" indicates that the network node NodeID is provided with the sensor CO2S, and the NodeID will be recorded in the network node profile for node management after the response to the query is made (for example, when the node joins in or leaves), or the contents of the NodeID will be updated after each query.

It should be particularly appreciated that, the aforesaid commands used between the sensor network and the application server of the present invention are similar to commands of a database. The commands are decomposed into text commands of the present invention to accomplish the communication between the application server and the sensing network by querying the respective configuration database according to the text commands. In this way, the present invention can accomplish the communication between different application servers and the sensor network by simply adjusting the configurations in the database without the need of rewriting a new program and a corresponding API as in the prior art.

Figure 3:
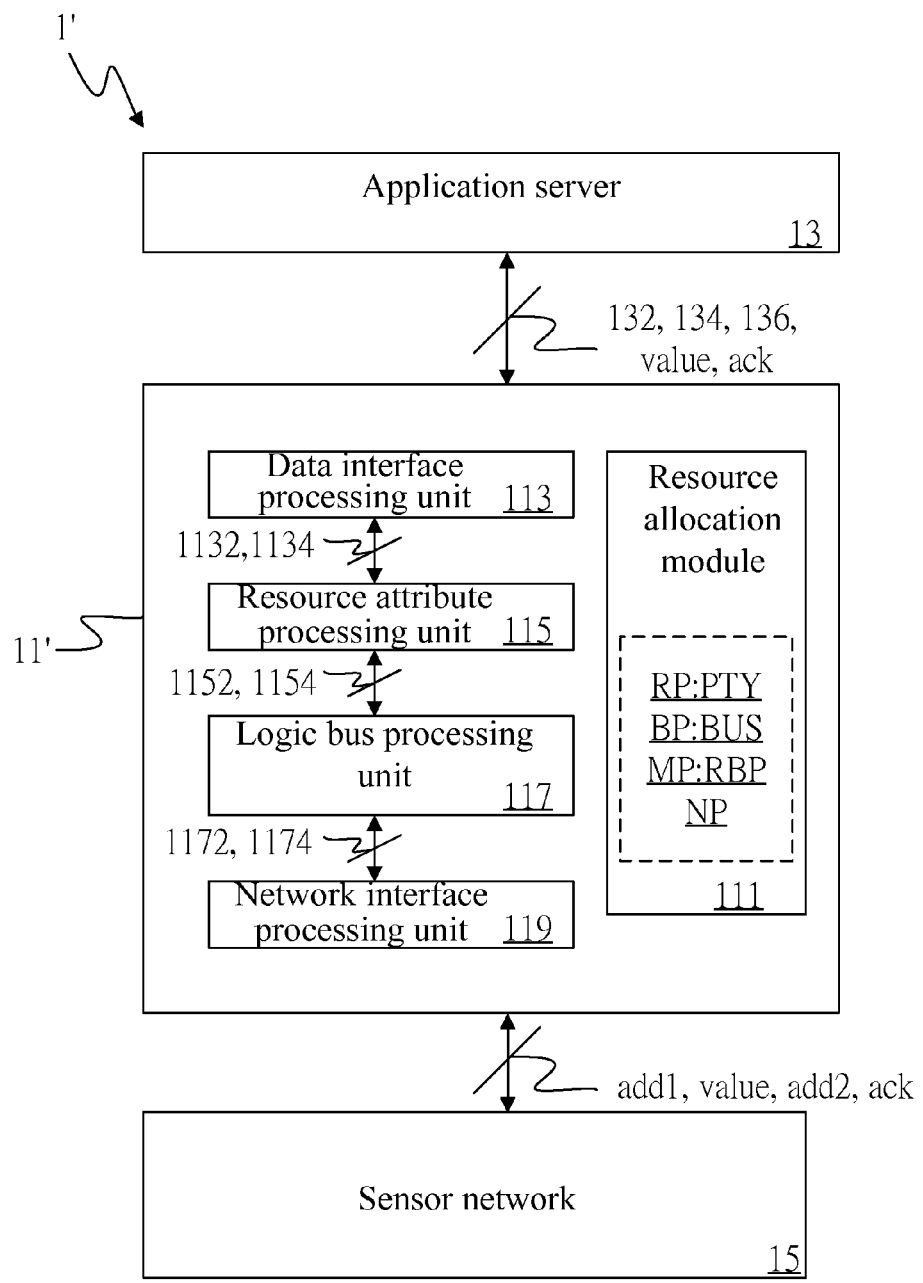
FIG. 3 is a schematic view of a sensor network system according to a third embodiment of the present invention.

Then, referring to FIG. 3, it is a schematic view of a sensor network system 1' according to a third embodiment of the present invention. The system architecture and the network connection environment in the third embodiment are the same as those in the previous embodiments, so elements with the same reference numerals also have the same functions and will not be further described herein. However, the third embodiment is different from the previous embodiments in that, the operations performed on the sensor after the sensor configuration in the sensor network is queried are described in the third embodiment.

Firstly, the user has known via the application server 13 that a sensor associated with the sensor information TYPE exists in the sensor network 15 in the third embodiment. Therefore, the user can transmit a sensor attribute query command 132 via the application server 13. In other words, the data interface processing unit 113 receives the sensor attribute query command 132 from the application server 13 and queries the sensor resource profile RP according to the sensor attribute query command 132.

Since the sensor resource profile RP further has an operation command of the sensor associated with the sensor information TYPE recorded therein, the data interface processing unit 113 can retrieve a piece of sensor attribute information PTY from the sensor resource profile RP and transmit the sensor attribute information PTY back to the application server 13. In this way, the user can know the operation functions of the sensor associated with the sensor information TYPE through the sensor attribute information PTY.

For ease of understanding, the aforesaid operation process will also be illustrated by an example. As in the example of the third embodiment, the user has known via the application server that the sensor CO2S exists in the sensor network. Therefore, the user can transmit the sensor attribute query command "SELECT FROM ida-CO2S" via the application server. The data interface processing unit receives the sensor attribute query command "SELECT FROM ida-CO2S" and queries the sensor resource profile RAA accordingly.

The sensor resource profile RAA further has the attribute and the operation command of the sensor associated with the sensor CO2S recorded therein, that is, an embodiment of the RP in FIG. 2 may comprise the attribute and the operation command of the sensor:

```
<RAA>
    <Resource>
        <Name>CO2S </Name>
        <Property>
            <Name>co2_ppm</Name>
            <ID>A01</ID>
            <AccessRead>Yes</AccessRead>
        </Property>
    </Resource>
</RAA>
```

Therefore, the data interface processing unit can retrieve a piece of sensor attribute information "co2_ppm:Read" from the sensor resource profile RAA and transmit the sensor attribute information "co2_ppm:Read" back to the application server. In this way, the user can know from the sensor attribute information "co2_ppm:Read" that the sensor CO2S has the operation of reading "co2_ppm".

In the third embodiment, the sensor associated with the sensor information TYPE has the basic reading/writing function. Accordingly, when the user wants to read the sensor associated with the sensor information TYPE and having a network node identification code id1, the data interface processing unit 113 receives a sensor attribute reading command 134 from the application server for the network node identification node id1 and the sensor attribute information PTY.

Then, the data interface processing unit 113 queries the sensor resource profile RP according to the sensor attribute reading command 134 and retrieves a sensor attribute configuration "AccessRead" from the sensor resource profile RP. Subsequently, the data interface processing unit 113 transmits a sensor bus output/input query command 1132 according to the sensor attribute configuration "AccessRead". The resource attribute processing unit 115 then queries the resource-bus mapping profile MP according to the sensor bus output/input query command 1132 and retrieves the bus mapping configuration RBP from the resource-bus mapping profile MP.

Subsequently, the resource attribute processing unit 115 queries the bus profile BP according to the bus mapping configuration RBP and retrieves a bus output/input configuration IO from the bus profile BP. The bus output/input configuration IO records an output/input state of the bus. Then, the resource attribute processing unit 115 transmits a network node reading command 1152 according to the bus output/input configuration IO.

The logic bus processing unit 117 queries a network node profile NP according to the network node reading command 1152 and retrieves a memory address add1 from the network node profile NP. Subsequently, the logic bus processing unit 117 issues a network node reading command 1172 according to the memory address add1. For the network node represented by the network node identification code id1, the network interface processing unit 119 reads a data table provided by the memory of the network node at the memory address add1 according to the network node reading command 1172 to obtain a sensor numeric value value and transmits the sensor numeric value value back to the application server 13.

For ease of understanding, the aforesaid operation process will be illustrated by an example hereafter. As in the previous example, the sensor CO2S has the basic reading function of co2_ppm:Read. Accordingly, when the user wants to read the co2_ppm numeric value of the sensor CO2S disposed at the network node NodeID, the data interface processing unit receives the sensor attribute reading command "SELECT co2_ppm FROM ida-CO2S WHERE device=NodeID" from the application server. The NodeID is a NodeID that has known by querying.

Then, the data interface processing unit queries the sensor resource profile RAA according to the sensor attribute reading command "SELECT co2_ppm FROM ida-CO2S WHERE device=NodeID" and retrieves a sensor attribute configuration "co2_ppm".

Subsequently, the data interface processing unit transmits the sensor bus output/input query command "RAA.CO2S -i co2_ppm -s NodeID" according to the sensor attribute configuration "co2_ppm". The resource attribute processing unit then queries the resource-bus mapping profile Mapping according to the sensor bus output/input query command "RAA.CO2S -i co2_ppm -s NodeID":

```
<Mapping>
  <ResourceOnBus>
    <Resource>CO2S </Resource>
    <Bus>GPIO</Bus>
    <PropertyonPort>
      <Property>A0 1</Property>
      <Port>P0 1</Port>
      <At>0</At>
    </PropertyonPort>
    <PropertyonPort>
      <Property>A02</Property>
      <Port>P02</Port>
      <At>32</At>
    </PropertyonPort>
    ...
  </ResourceOnBus>
</Mapping>
``` and retrieves the bus mapping configuration CO2S.GPIO from the resource-bus mapping profile MP and attribute co2_ppm identified as A01 corresponding to location 0 of port P01 of GPIO. Subsequently, the resource attribute processing unit queries the bus profile LBA according to the bus mapping configuration CO2S.GPIO. The bus profile LBA is an embodiment of the BP in FIG. 2, which further comprises a description of the output/input configuration of the GPIO bus as follows:

```
<LBA>
  <Bus>
    <Name>GPIO</Name>
  </Bus>
  <BusProfile>
    <Name>GPIO</Name>
    <Port>
      <Name>AI</Name>
      <ID>P0 1</ID>
    </Port>
    <Port>
    ...
  </BusProfile>
</LBA>
```

The resource attribute processing unit further retrieves a bus output/input configuration GPIO.AI from the bus profile LBA. Then, the resource attribute processing unit transmits the network node reading command "LBA GPIO -i AI0 -s NodeID" according to the bus output/input configuration GPIO.AI.

The logic bus processing unit queries the network node profile TBA according to the network node reading command "LBA GPIO -i AI0 -s NodeID":

```
<TBA>
  <Table>
    <Name>GPIO.AI</Name>
    <ID>0x41<ID>
    <Len>32</Len>
  </Table>
  ...
</TBA>
```

The logic bus processing unit further retrieves a memory address 0x41 and memory length 32 from the network node profile TBA. Subsequently, the logic bus processing unit issues a network node reading command "read 0x41 0 32" according to the memory address 0x41. For the network node NodeID, the network interface processing unit reads data starting from relative memory address 0 with length 32 of the data table of the network node NodeID at the memory address 0x41 according to the network node reading command "read 0x41 0 32" to obtain a sensor numeric value ppm and transmits the sensor numeric value ppm back to the application server.

On the other hand, when the user wants to write in or update the attribute of the sensor associated with the sensor information TYPE and having the network node identification code id1, the data interface processing unit 113 receives a sensor attribute writing command 136 from the application server for the network node identification code id1 and the sensor attribute information PTY.

Then, the data interface processing unit 113 queries the sensor resource profile RP according to the sensor attribute writing command 136 and retrieves a sensor attribute configuration "AccessWrite" from the sensor resource profile RP. Subsequently, the data interface processing unit 113 transmits a sensor bus output/input query command 1134 according to the sensor attribute configuration "AccessWrite". The resource attribute processing unit 115 then queries the resource-bus mapping profile MP according to the sensor bus output/input query command 134 and retrieves the bus mapping configuration RBP from the resource-bus mapping profile MP.

Subsequently, the data attribute processing unit 115 queries the bus profile BP according to the bus mapping configuration RBP and retrieves the bus output/input configuration IO from the bus profile BP. The bus output/input configuration IO records an output/input state of the bus. Then, the data attribute processing unit 115 transmits a network node writing command 1154 according to the bus output/input configuration IO.

The logic bus processing unit 117 queries the network node profile NP according to the network node writing command 1154 and retrieves a memory address add2 from the network node profile NP. Subsequently, the logic bus processing unit 117 issues a network node writing command 1174 according to the memory address add2. For the network node represented by the network node identification node id1, the network interface processing unit 119 writes the data into the data table provided by the memory of the network node at the memory address add2 according to the network node writing command 1174, obtains a writing response ack and transmits the writing response ack back to the application server 13.

For ease of understanding, the aforesaid operation process will also be illustrated by an example. As in the previous example, the sensor CO2S has a basic writing function of "altitude: Write". Accordingly, when the user wants to writes in an altitude numeric value for the sensor CO2S disposed at the network node NodeID, the data interface processing unit receives the sensor attribute writing command "UPDATE ida-CO2S SET altitude=300 WHERE device=NodeID" from the application server.

Then, the data interface processing unit queries the sensor resource profile RAA according to the sensor attribute reading command "UPDATE ida-CO2S SET altitude=300 WHERE device=NodeID". The sensor resource profile RAA is as follows:

```
<RAA>
    <Resource>
        <Name>CO2S</Name>
        <Property>
            <Name>altitude</Name>
            <ID>A02</ID>
            <AccessRead>Yes</AccessRead>
            <AccessWrite>Yes</AccessWrite>
        </Property>
    </Resource>
</RAA>
```

The data interface processing unit can retrieve the sensor attribute configuration "altitude" from the sensor resource profile RAA.

Subsequently, the data interface processing unit transmits the sensor bus output/input query command "RAA.CO2S -u altitude 300 -s NodeID" according to the sensor attribute configuration "altitude". The resource attribute processing unit then queries the resource-bus mapping profile Mapping according to the sensor bus output/input query command "RAA.CO2S -u altitude 300 -s NodeID" and retrieves the bus mapping configuration CO2S.GPIO from the resource-bus mapping profile Mapping and attribute "altitude" identified as A02 corresponding to location 32 of port P02 of GPIO. Subsequently, the resource attribute processing unit queries the bus profile LBA according to the bus mapping configuration CO2S.GPIO. The bus profile LBA is as follows:

```
<LBA>
    <Bus>
        <Name>GPIO</Name>
    </Bus>
    <BusProfile>
        <Name>GPIO</Name>
        <Port>
            <Name>AI</Name>
            <ID>P0 1</ID>
        </Port>
        <Port>
            <Name>AO</Name>
            <ID>P02</ID>
        </Port>
        ...
    </BusProfile>
</LBA>
```

The data attribute processing unit further retrieves a bus output/input configuration GPIO.AO from the bus profile LBA. Then, the data attribute processing unit transmits the network node writing command "LBA.GPIO -u AO32 300 -s NodeID" according to the bus output/input configuration GPIO.AO.

The logic bus processing unit queries the network node profile TBA according to the network node reading command "LBA.GPIO -u AO32 300 -s NodeID". The network node profile TBA is as follows:

```
<TBA>
    <Table>
        <Name>GPIO.A0</Name>
        <ID>0x51<ID>
        <Len>32</Len>
    </Table>
    ...
</TBA>
```

The logic bus processing unit further retrieves the memory address 0x51 from the network node profile TBA. Subsequently, the logic bus processing unit issues the network node writing command "write 0x51 32 1 300" according to the memory address 0x51 while "1" means the number of the data. For the network node NodeID, the network interface processing unit writes the numeric value 300 into the started location 32 of the data table provided by the memory of the network node NodeID at the memory address 0x51 according to the network node writing command "write 0x51 32 1 300", obtains the writing response ack, and transmits the writing response ack back to the application server.

Likewise, each of the aforesaid commands received by the data interface processing unit from the application server may also be a command for multiple network nodes, multiple sensors and multiple attribute values (for example, "UPDATE ida-CO2S, ida-ISKT SET altitude=300, power=ON WHERE device=NodeID1, device=NodeID2"). This can be readily appreciated by those skilled in the art based on the above disclosure, and thus the detailed operations will be not further described herein.

Figure 4:
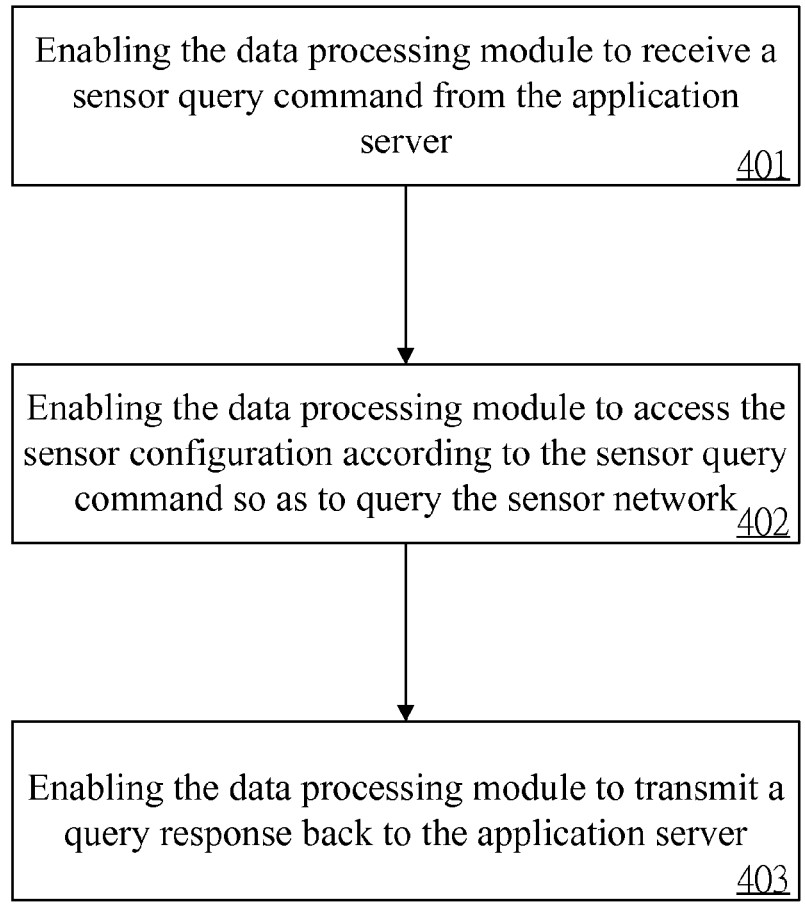
FIG. 4 is a flowchart diagram of a data integration method according to a fourth embodiment of the present invention.
Figure 5A:
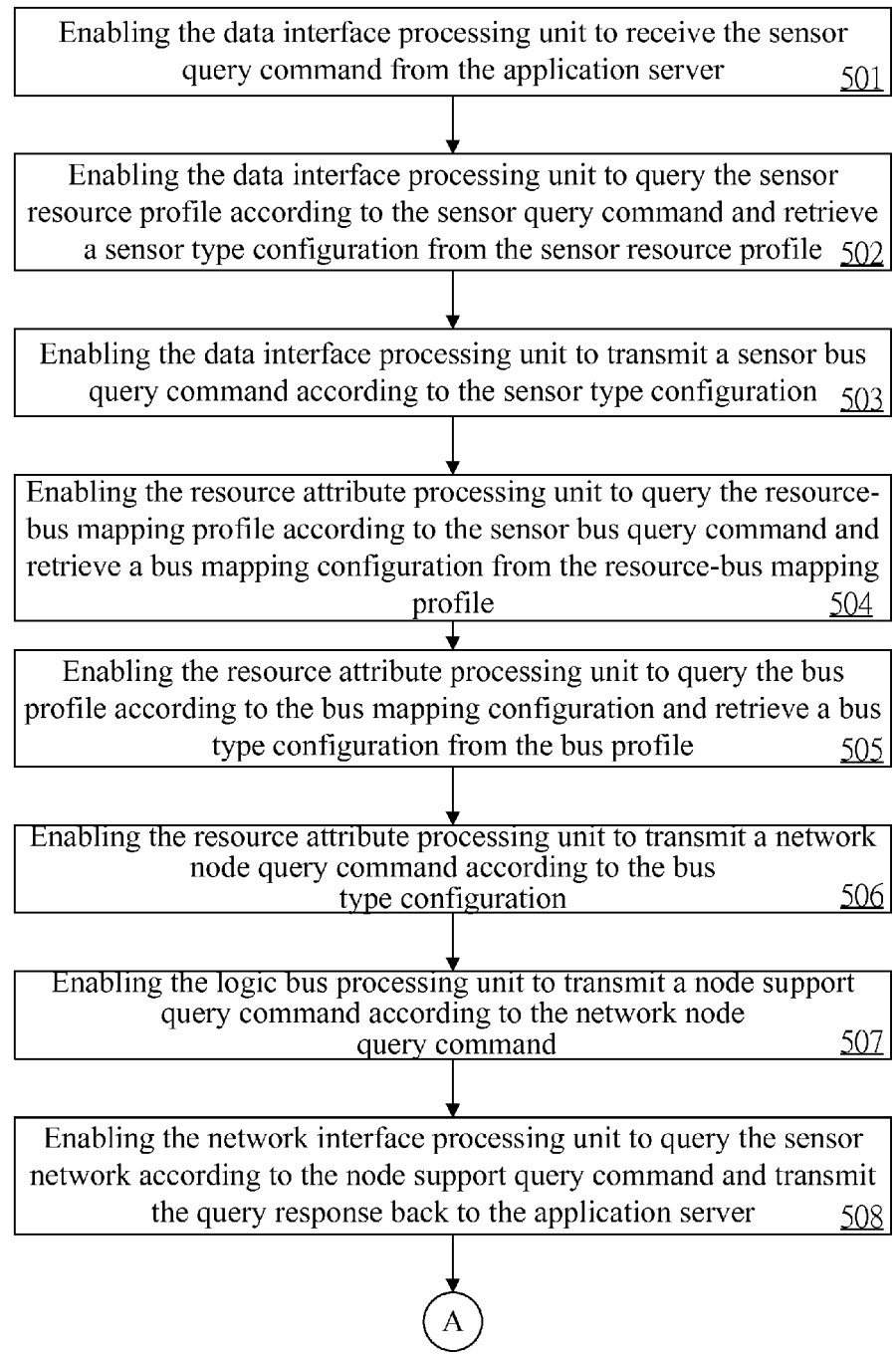
FIGS. 5A-5D are a flowchart diagram of a data integration method according to a fifth embodiment of the present invention.
Figure 5B:
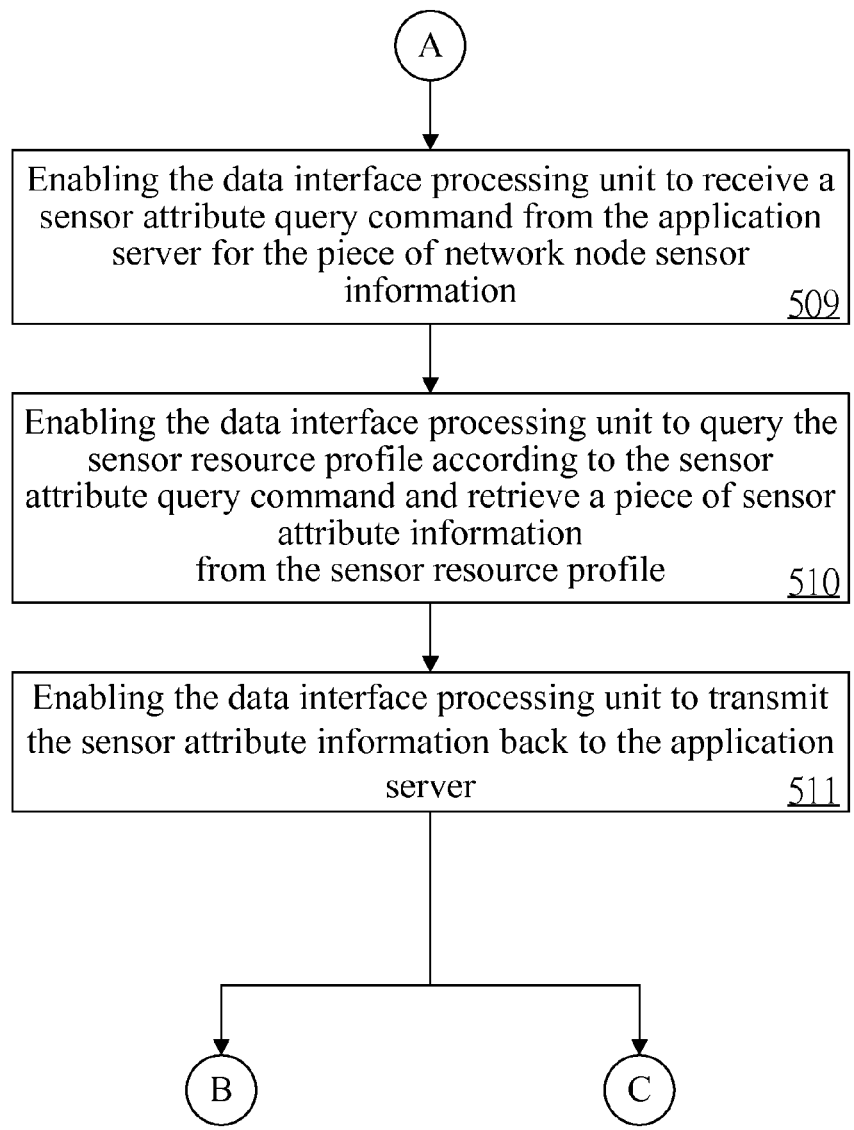
Figure 5C:
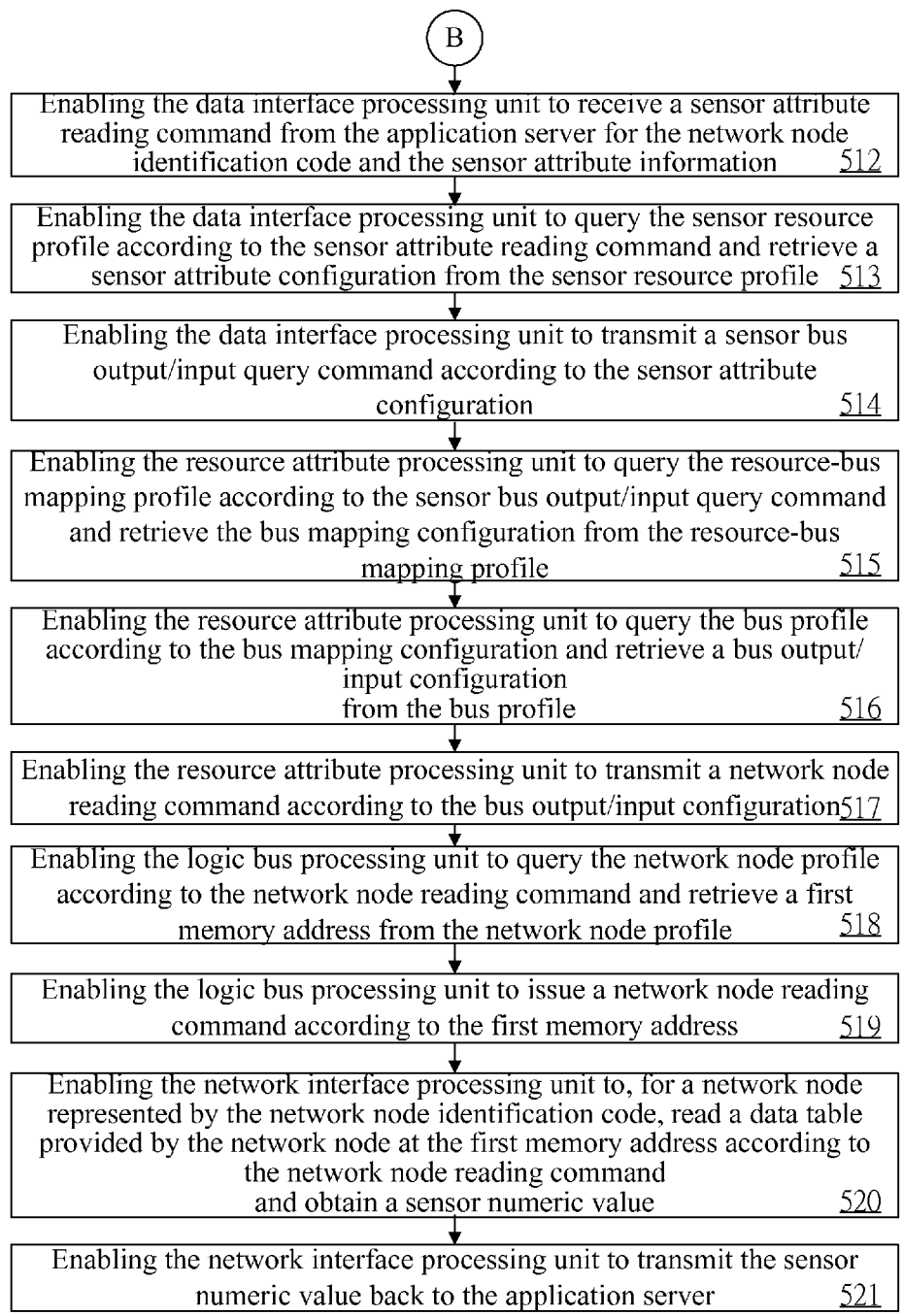
Figure 5D:
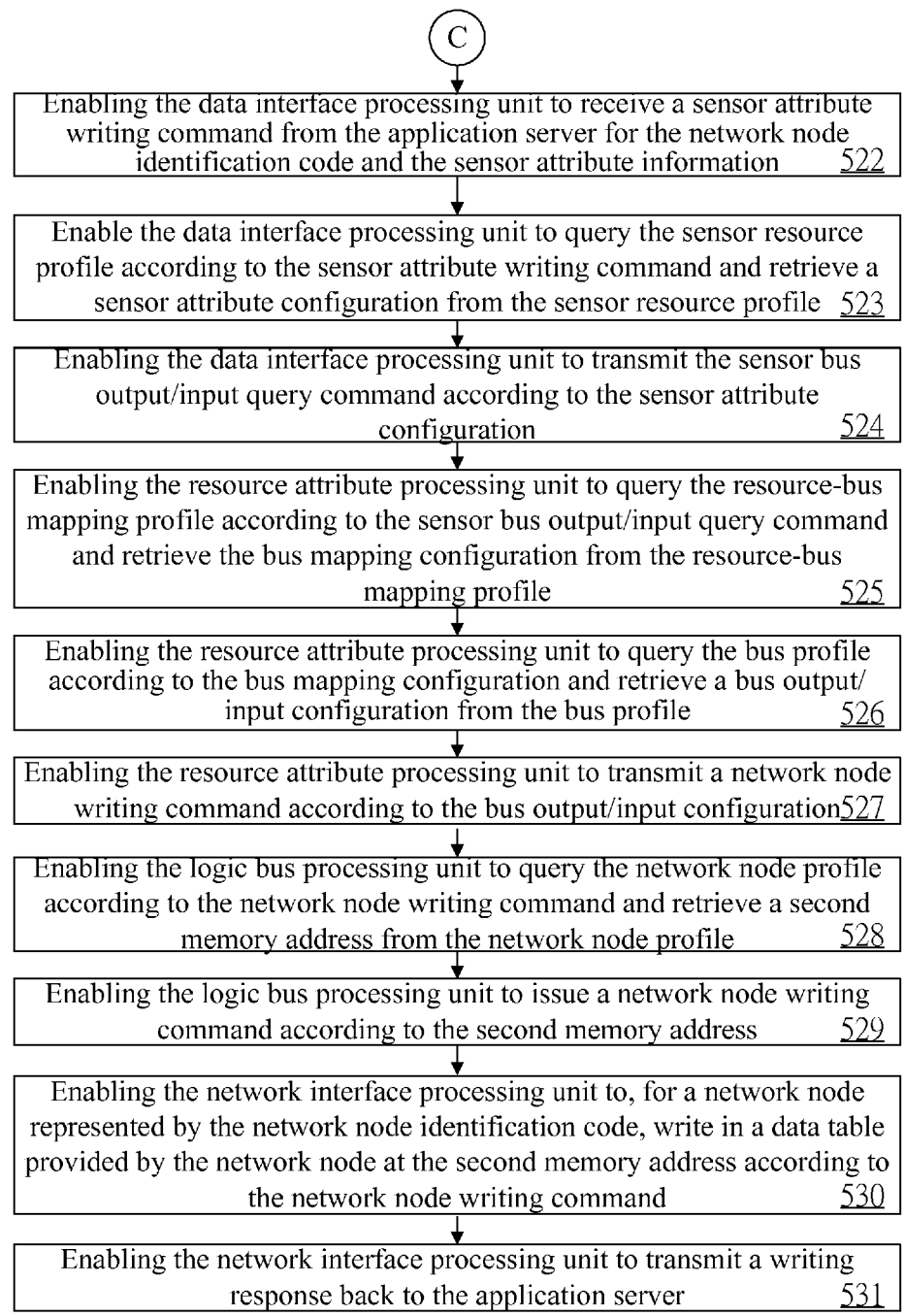

A fourth embodiment of the present invention is a data integration method, a flowchart diagram of which is shown in FIG. 4. The method of the fourth embodiment is for use in a data integration apparatus, which comprises a resource allocation module and a data processing module. The data integration apparatus is for use in a sensor network system. The sensor network system comprises a sensor network and an application server. The data allocation module is stored with a sensor configuration. The data processing module is connected with the application server and the sensor network. The detailed steps of the fourth embodiment are described as follows.

Firstly, when a user wants to perform operations of the sensor network through the sensor application of the application server, the user can transmit a sensor query command to the data integration apparatus directly via the application server. Therefore, step 401 is executed to enable the data processing module to receive a sensor query command from the application server.

Step 402 is executed to enable the data processing module to access the sensor configuration according to the sensor query command so as to query the sensor network. Finally, step 403 is executed to enable the data processing module to transmit a query response back to the application server so as to accomplish the communication between the application server and the sensor network.

A fifth embodiment of the present invention is a data integration method, a flowchart diagram of which is shown in FIGS. 5A-5D. The method of the fifth embodiment is for use in a data integration apparatus, which comprises a resource allocation module and a data processing module. The data integration apparatus is for use in a sensor network system. The sensor network system comprises a sensor network and an application server. The data allocation module is stored with a sensor configuration. The sensor configuration further comprises a sensor resource profile, a bus profile, a resource-bus mapping profile and a network node profile.

The data processing module further comprises a data interface processing unit, a resource attribute processing unit, a logic bus processing unit and a network interface processing unit. The data processing module connects with the application server via the data interface processing unit and connects with the sensor network via the network interface processing unit. The detailed steps of the fifth embodiment are described as follows.

Similarly, when a user wants to perform operations of the sensor network through the sensor application of the application server, the user can transmit a sensor query command to the data integration apparatus directly via the application server firstly. Therefore, step 501 is executed to enable the data interface processing unit to receive the sensor query command from the application server. Subsequently, step 502 is executed to enable the data interface processing unit to query the sensor resource profile according to the sensor query command and retrieve a sensor type configuration from the sensor resource profile.

Then, step 503 is executed to enable the data interface processing unit to transmit a sensor bus query command according to the sensor type configuration. Step 504 is executed to enable the resource attribute processing unit to query the resource-bus mapping profile according to the sensor bus query command and retrieve a bus mapping configuration from the resource-bus mapping profile. Step 505 is executed to enable the resource attribute processing unit to query the bus profile according to the bus mapping configuration and retrieve a bus type configuration from the bus profile.

Subsequently, step 506 is executed to enable the resource attribute processing unit to transmit a network node query command according to the bus type configuration. Step 507 is executed to enable the logic bus processing unit to transmit a node support query command according to the network node query command. Step 508 is executed to enable the network interface processing unit to query the sensor network according to the node support query command and transmit the query response back to the application server. The query response comprises a network node identification code and a piece of network node sensor information.

Then, the attribute of the sensor of the network node can be queried after the network node identification code and the network node sensor information of the sensor network are obtained by the application server. Step 509 is executed to enable the data interface processing unit to receive a sensor attribute query command from the application server for the piece of network node sensor information. Step 510 is executed to enable the data interface processing unit to query the sensor resource profile according to the sensor attribute query command and retrieve a piece of sensor attribute information from the sensor resource profile. Step 511 is executed to enable the data interface processing unit to transmit the piece of sensor attribute information back to the application server.

After the sensor attribute information has been known by the application server, the corresponding reading and writing operations can be performed on the network node. The reading-related operations will be described firstly. Step 512 is executed to enable the data interface processing unit to receive a sensor attribute reading command from the application server for the network node identification code and the piece of sensor attribute information. Step 513 is executed to enable the data interface processing unit to query the sensor resource profile according to the sensor attribute reading command and retrieve a sensor attribute configuration from the sensor resource profile.

Then, step 514 is executed to enable the data interface processing unit to transmit a sensor bus output/input query command according to the sensor attribute configuration. Step 515 is executed to enable the resource attribute processing unit to query the resource-bus mapping profile according to the sensor bus output/input query command and retrieve the bus mapping configuration from the resource-bus mapping profile. Step 516 is executed to enable the resource attribute processing unit to query the bus profile according to the bus mapping configuration and retrieve a bus output/input configuration from the bus profile.

Subsequently, step 517 is executed to enable the resource attribute processing unit to transmit a network node reading command according to the bus output/input configuration. Step 518 is executed to enable the logic bus processing unit to query the network node profile according to the network node reading command and retrieve a first memory address from the network node profile. Step 519 is executed to enable the logic bus processing unit to issue a network node reading command according to the first memory address.

Step 520 is executed to enable the network interface processing unit to, for a network node represented by the network node identification code, read a data table provided by the network node at the first memory address according to the network node reading command and obtain a sensor numeric value. Step 521 is executed to enable the network interface processing unit to transmit the sensor numeric value back to the application server.

Next, the writing-related operations will be described. Step 522 is executed to enable the data interface processing unit to receive a sensor attribute writing command from the application server for the network node identification code and the piece of sensor attribute information. Step 523 is executed to enable the data interface processing unit to query the sensor resource profile according to the sensor attribute writing command and retrieve a sensor attribute configuration from the sensor resource profile. Step 524 is executed to enable the data interface processing unit to transmit a sensor bus output/input query command according to the sensor attribute configuration.

Then, step 525 is executed to enable the resource attribute processing unit to query the resource-bus mapping profile according to the sensor bus output/input query command and retrieve the bus mapping configuration from the resource-bus mapping profile. Step 526 is executed to enable the resource attribute processing unit to query the bus profile according to the bus mapping configuration and retrieve a bus output/input configuration from the bus profile. Step 527 is executed to enable the resource attribute processing unit to transmit a network node writing command according to the bus output/input configuration.

Subsequently, step 528 is executed to enable the logic bus processing unit to query the network node profile according to the network node writing command and retrieve a second memory address from the network node profile. Step 529 is executed to enable the logic bus processing unit to issue a network node writing command according to the second memory address. Step 530 is executed to enable the network interface processing unit to, for a network node represented by the network node identification code, write in a data table provided by the network node at the second memory address according to the network node writing command. Step 531 is executed to enable the network interface processing unit to transmit a writing response back to the application server.

According to the above descriptions, the data integration apparatus of the present invention can perform layered management on the network nodes and the sensor-related configurations of the sensor network, access the configurations through use of text commands of database-like operations, and finally provide the operation result data to the application server in a table format. In this way, the need of taking the underlying configuration associated with the sensor network into consideration is eliminated when the application is developed, which can accelerate the development of the application and improve the flexibility in use of the application.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A data integration apparatus for use in a sensor network system, the sensor network system comprising a sensor network and an application server, and the data integration apparatus comprising:
    a resource allocation module, being stored with a sensor configuration which comprises a sensor resource profile, a bus profile and a resource-bus mapping profile;
    a data processing module connected with the application server and the sensor network, comprising:
        a data interface processing unit, being configured to:
            receive a sensor query command from the application server;
            query the sensor resource profile of the sensor configuration according to the sensor query command and retrieve a sensor type configuration from the sensor resource profile; and
            transmit a sensor bus query command according to the sensor type configuration;
        a resource attribute processing unit, being configured to:
            query the resource-bus mapping profile according to the sensor bus query command and retrieve a bus mapping configuration from the resource-bus mapping profile;
            query the bus profile according to the bus mapping configuration and retrieve a bus type configuration from the bus profile; and
            transmit a network node query command according to the bus type configuration;
        a logic bus processing unit, being configured to:
            transmit a node support query command according to the network node query command;
        a network interface processing unit connected with the sensor network, being configured to:
            query the sensor network according to the node support query command and transmit a query response back to the application server, wherein the query response comprises a network node identification code and a piece of network node sensor information;
    wherein the sensor configuration records configuration data which are associated with sensors of the sensor network and the configuration data associated with the sensors are updated after being accessed.

2. The data integration apparatus as claimed in claim 1, wherein the data interface processing unit is further configured to:
    receive a sensor attribute query command from the application server for the piece of network node sensor information;
    query the sensor resource profile according to the sensor attribute query command and retrieve a piece of sensor attribute information from the sensor resource profile; and
    transmit the piece of sensor attribute information back to the application server.

3. The data integration apparatus as claimed in claim 2, wherein the sensor configuration further comprises a network node profile, and the data interface processing unit is further configured to:
    receive a sensor attribute reading command from the application server for the network node identification code and the piece of sensor attribute information;

query the sensor resource profile according to the sensor attribute reading command and retrieve a sensor attribute configuration from the sensor resource profile; and transmit a sensor bus output/input query command according to the sensor attribute configuration;

wherein the resource attribute processing unit is further configured to:
    query the resource-bus mapping profile according to the sensor bus output/input query command and retrieve the bus mapping configuration from the resource-bus mapping profile;
    query the bus profile according to the bus mapping configuration and retrieve a bus output/input configuration from the bus profile; and
    transmit a network node reading command according to the bus output/input configuration;

wherein the logic bus processing unit is further configured to:
    query the network node profile according to the network node reading command and retrieve a memory address from the network node profile; and
    issue a network node reading command according to the memory address;

wherein the network interface processing unit is further configured to:
    for a network node represented by the network node identification node, read a data table provided by the network node at the memory address according to the network node reading command and obtain a sensor numeric value; and
    transmit the sensor numeric value back to the application server.

4. The data integration apparatus as claimed in claim 2, wherein the sensor configuration further comprises a network node profile, and the data interface processing unit is further configured to:
    receive a sensor attribute writing command from the application server for the network node identification code and the sensor attribute information;
    query the sensor resource profile according to the sensor attribute writing command and retrieve a sensor attribute configuration from the sensor resource profile; and
    transmit a sensor bus output/input query command according to the sensor attribute configuration;

wherein the resource attribute processing unit is further configured to:
    query the resource-bus mapping profile according to the sensor bus output/input query command and retrieve the bus mapping configuration from the resource-bus mapping profile;
    query the bus profile according to the bus mapping configuration and retrieve a bus output/input configuration from the bus profile; and
    transmit a network node writing command according to the bus output/input configuration;

wherein the logic bus processing unit is further configured to:
    query the network node profile according to the network node writing command and retrieve a memory address from the network node profile; and
    transmit a network node writing command according to the memory address;

wherein the network interface processing unit is further configured to:
    for a network node represented by the network node identification node, write in a data table provided by the network node at the memory address according to the network node writing command; and
    transmit a writing response back to the application server.

5. A data integration method for use in a data integration apparatus, wherein the data integration apparatus is for use in a sensor network system and comprises a resource allocation module and a data processing module, the sensor network system comprises a sensor network and an application server, the data allocation module is stored with a sensor configuration which comprises a sensor resource profile, a bus profile and a resource-bus mapping profile, the data processing module, which comprises a data interface processing unit, a resource attribute processing unit, a logic bus processing unit and a network interface processing unit, is connected with the application server and the sensor network, and the data integration method comprises the following steps of:
    (a) enabling the data interface processing unit to receive a sensor query command from the application server;
    (b1) enabling the data interface processing unit to query the sensor resource profile according to the sensor query command and retrieve a sensor type configuration from the sensor resource profile;
    (b2) enabling the data interface processing unit to transmit a sensor bus query command according to the sensor type configuration;
    (b3) enabling the resource attribute processing unit to query the resource-bus mapping profile according to the sensor bus query command and retrieve a bus mapping configuration from the resource-bus mapping profile;
    (b4) enabling the resource attribute processing unit to query the bus profile according to the bus mapping configuration and retrieve a bus type configuration from the bus profile;
    (b5) enabling the resource attribute processing unit to transmit a network node query command according to the bus type configuration;
    (b6) enabling the logic bus processing unit to transmit a node support query command according to the network node query command;
    (b7) enabling the network interface processing unit to query the sensor network according to the node support query command, wherein the query response comprises a network node identification code and a piece of network node sensor information; and
    (c) enabling the network interface processing unit to transmit a query response back to the application server;
    wherein the sensor configuration records configuration data which are associated with sensors of the sensor network and the configuration data associated with the sensors are updated after being accessed.

6. The data integration method as claimed in claim 5, further comprising the following steps of:
    (d) enabling the data interface processing unit to receive a sensor attribute query command from the application server for the piece of network node sensor information;
    (e) enabling the data interface processing unit to query the sensor resource profile according to the sensor attribute query command and retrieve a piece of sensor attribute information from the sensor resource profile; and
    (f) enabling the data interface processing unit to transmit the piece of sensor attribute information back to the application server.

7. The data integration method as claimed in claim 6, wherein the sensor configuration further comprises a network node profile, and the data integration method further comprises the following steps of:

(g) enabling the data interface processing unit to receive a sensor attribute reading command from the application server for the network node identification code and the piece of sensor attribute information;

(h) enabling the data interface processing unit to query the sensor resource profile according to the sensor attribute reading command and retrieve a sensor attribute configuration from the sensor resource profile;

(i) enabling the data interface processing unit to transmit a sensor bus output/input query command according to the sensor attribute configuration;

(j) enabling the resource attribute processing unit to query the resource-bus mapping profile according to the sensor bus output/input query command and retrieve the bus mapping configuration from the resource-bus mapping profile;

(k) enabling the resource attribute processing unit to query the bus profile according to the bus mapping configuration and retrieve a bus output/input configuration from the bus profile;

(l) enabling the resource attribute processing unit to transmit a network node reading command according to the bus output/input configuration;

(m) enabling the logic bus processing unit to query the network node profile according to the network node reading command and retrieve a memory address from the network node profile;

(n) enabling the logic bus processing unit to issue a network node reading command according to the memory address;

(o) enabling the network interface processing unit to, for a network node represented by the network node identification code, read a data table provided by the network node at the memory address according to the network node reading command and obtain a sensor numeric value; and (p) enabling the network interface processing unit to transmit the sensor numeric value back to the application server.

8. The data integration method as claimed in claim 6, wherein the sensor configuration further comprises a network node profile, and the data integration method further comprises the following steps of:

(g) enabling the data interface processing unit to receive a sensor attribute writing command from the application server for the network node identification code and the piece of sensor attribute information;

(h) enabling the data interface processing unit to query the sensor resource profile according to the sensor attribute writing command and retrieve a sensor attribute configuration from the sensor resource profile;

(i) enabling the data interface processing unit to transmit a sensor bus output/input query command according to the sensor attribute configuration;

(j) enabling the resource attribute processing unit to query the resource-bus mapping profile according to the sensor bus output/input query command and retrieve the bus mapping configuration from the resource-bus mapping profile;

(k) enabling the resource attribute processing unit to query the bus profile according to the bus mapping configuration and retrieve a bus output/input configuration from the bus profile;

(l) enabling the resource attribute processing unit to transmit a network node writing command according to the bus output/input configuration;

(m) enabling the logic bus processing unit to query the network node profile according to the network node writing command and retrieve a memory address from the network node profile;

(n) enabling the logic bus processing unit to issue a network node writing command according to the memory address;

(o) enabling the network interface processing unit to, for a network node represented by the network node identification code, write in a data table provided by the network node at the memory address according to the network node writing command; and (p) enabling the network interface processing unit to transmit a writing response back to the application server after the step (o).

* * * * *